1,795,868

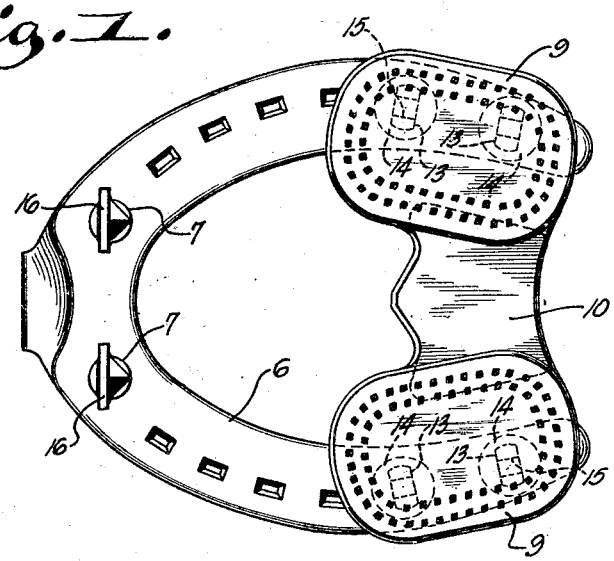
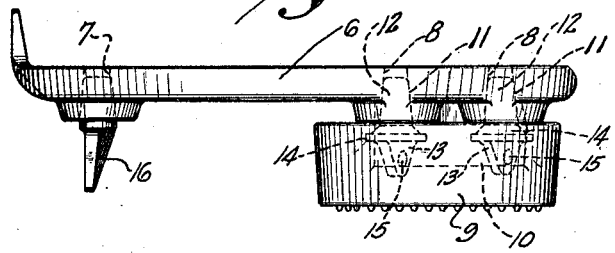
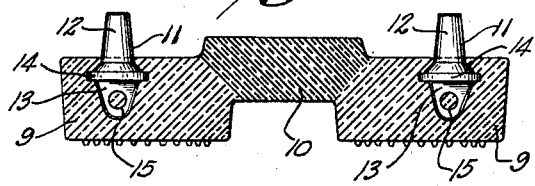
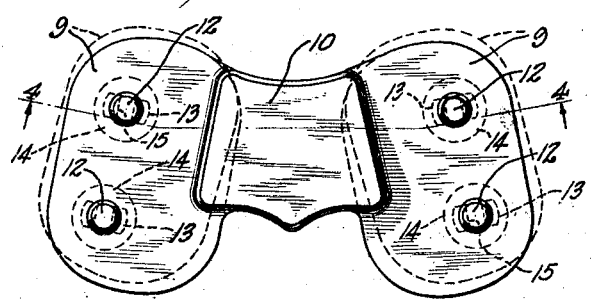
INVENTORS
William H. Krug &
BY Carl G. Akerberg,
Morsell, Keeney & Morsell
ATTORNEYS Patented Mar. 10, 1931

UNITED STATES PATENT OFFICE

WILLIAM H. KRUG, OF TAYCHEEDA, AND CARL G. AKERBERG, OF OSHKOSH, WISCONSIN, ASSIGNORS TO GIANT GRIP MFG. CO., OF OSHKOSH, WISCONSIN, A CORPORATION OF WISCONSIN

FLEXIBLE RUBBER BAR PAD FOR HORSESHOES

Application filed March 24, 1930. Serial No. 438,443.

This invention relates to improvements in flexible rubber bar-pads for horseshoes.

It is one of the objects of the present invention to provide a resilient bar-pad for horseshoes comprising a pair of resilient heel pads joined by a bar of flexible material whereby the device may be stretched, contracted or twisted slightly so as to properly adjust it to correctly fit various widths of horseshoes with the result that a horseshoe so equipped will accurately fit a horse's hoof.

A further object of the invention is to provide a horseshoe bar-pad of the class described wherein the pads are anchored onto metallic calks, the latter having tapered shank portions for detachable wedging engagement with tapered openings therefor in the horseshoe. The construction of the bar permits flexing, stretching or contracting of the pads with respect to each other to permit registration of the calk shanks with the shoe openings for insertion therein and consequent easy and correct fitting of a bar-pad to a shoe, regardless of the width of the shoe heel portion.

A further advantage of the invention is that due to the bar-pad construction, a horseshoe to be fitted on a hoof may be spread or closed somewhat to accurately adapt it to the hoof, and then the bar-pad to be mounted on the shoe may be easily stretched or contracted to conform with the width of the shoe heel portion.

A further object of the invention is to provide a detachable flexible bar-pad for horseshoes wherein the pads are formed of hard rubber for long wear and are securely anchored onto metallic calks, while the bar connecting the pads is formed of a softer rubber so as to flex or yield.

A further object of the invention is to provide a flexible rubber bar-pad for horseshoes which is of very simple construction, is strong and durable, and is well adapted for the purposes described.

With the above and other objects in view the invention consists of the improved flexible rubber bar-pad for horseshoes and its parts and combinations as set forth in the claims, and all equivalents thereof.

In the accompanying drawing in which the same reference characters indicate the same parts in all of the views:

Fig. 1 is an inverted plan view of a horseshoe equipped with the improved flexible rubber bar-pad;

Fig. 2 is a side view thereof;

Fig. 3 is a plan view of the flexible rubber bar-pad; and

Fig. 4 is a sectional view taken on line 4—4 of Fig. 3.

Referring now more particularly to the drawing it will appear that the numeral 6 indicates a horseshoe having in its front portion a pair of spaced, upwardly projecting tapered openings 7, and two pairs of similarly shaped and spaced openings 8 in its rear or heel portion.

The improved flexible rubber bar-pad comprises a pair of similar resilient pads 9 of a substantial size and substantially oval in shape. Said pads are normally positioned so as to slightly forwardly diverge with respect to each other and they are connected by a flexible bar member 10. The bar member 10 is formed of flexible or yieldable rubber, while the pads 9 are formed of a relatively harder rubber which has resilient qualities, but which will not wear down quickly when subjected to abrasive action. The bar member 10 bridges the space between the side portions of the pads, as shown in Fig. 4, and merges into said pads at its end portions so as to form an integral unit. The top surface of said bar member is raised somewhat, as shown, while its under surface is elevated above the level of the lower surfaces of the pads so that it will not be subjected to wear when in use.

Each pad 9 has embedded therein stem and anchoring portions of a pair of suitably spaced-apart metallic calks 11. A calk includes a tapered shank 12, round in cross-section, a comparatively flat and downwardly tapered stem 13, and a medial enlarged flared or anchoring portion 14. The stem of the calk is formed with a relatively large circular opening 15 extending therethrough. The stem and flared portions of a pair of calks 11 are embedded in a pad 9, as shown in Figs. 2 and 4, and because of the openings 15 in the calk stems the rubber of the pad enters said openings, completely filling the same and extending therethrough, with the result that the pad is very firmly anchored onto its calks. It should also be noted that the stem portion of each calk is relatively thin or flat with comparatively broad face portions, and this shape of the stems will prevent the pad from turning thereon.

The improved flexible rubber bar-pad is applied to the heel portion of a horseshoe in the position and in the manner shown in Figs. 1 and 2. By spreading or contracting the pads 9 with respect to each other, through the medium of the flexible bar 10, the tapered shanks of the pairs of calks of the two pads may be brought into registration with the pairs of tapered openings 8 in the horseshoe and then the shanks are driven wedgingly thereinto. Fig. 3 illustrates in dotted lines the manner in which the pads may be spread with respect to each other from their normal position to fit a somewhat wider horseshoe.

Any suitable type of calks may be used in the front portion of the horseshoe, and in the drawing metallic calks 16 are illustrated, the same having tapered shanks wedgingly driven into the openings 7.

It is obvious that the pad portions of the flexible rubber bar-pad may be varied as to shape and proportions without departing from the spirit of the invention and each pad may be mounted on one or more metal calks, depending upon the particular requirements.

From the foregoing description it will be evident that the improved flexible rubber bar-pad possesses marked advantages over bar-pads now in use. The flexible bar permits ready adjustments of the pads with respect to each other to suit the bar-pad to any horseshoe, regardless of the width of the horseshoe across its heel portion. The formation of the calks permits their easy insertion into the horseshoe openings and pressure on the pad, when in use, will keep the calk shanks firmly wedged within their openings. The pads are resilient and will not wear unduly, but when replacement is necessary, the bar-pad may be easily removed from the shoe without removing the shoe from the animal's hoof. The flexible rubber bar-pad for horseshoes is also of simple and novel construction and is well adapted for the purposes described.

What is claimed as the invention is:

1. A horseshoe attachment, comprising a pair of pad members, each adapted to underlie only a heel portion of a horseshoe, a metallic member for each pad member and each metallic member having a portion thereof embedded in its pad and having a projecting portion for engagement with a horseshoe, and a readily yieldable bar member joining said pad members to permit spreading or contracting of the pad members with respect to each other.

2. A horseshoe bar-pad, comprising a pair of pads formed of a relatively hard resilient material, a bar extending transversely between said pads and connected at its end portions to both of the same and formed of a resilient material having a considerably greater degree of yieldability than that of the pads, and members carried by the pads for detachably connecting the device to a horseshoe.

3. A horseshoe bar-pad, comprising a pair of spaced-apart pads formed of a relatively hard resilient material, a bar connecting inner side portions of said pads and formed of a resilient material having a considerably greater degree of yieldability than that of the pads whereby the pads may be spread or contracted with respect to each other to adjustably fit a horseshoe, and metallic members carried by the pads for attaching the device to a horseshoe.

4. A horseshoe bar-pad, comprising a pair of spaced-apart pads formed of a relatively hard resilient material, a bar connecting inner side portions of said pads and formed of a resilient material having a considerably greater degree of yieldability than that of the pads whereby the pads may be spread or contracted with respect to each other to adjustably fit a horseshoe, the bottom surface of said bar being above the bottom surfaces of the pads, and metallic calk members anchored within the pads and having projecting portions for detachable engagement with openings in a horseshoe.

In testimony whereof we affix our signatures.

WILLIAM H. KRUG.
CARL G. AKERBERG.